INVENTOR:
Herbert Wilhelm Gustav OCKER

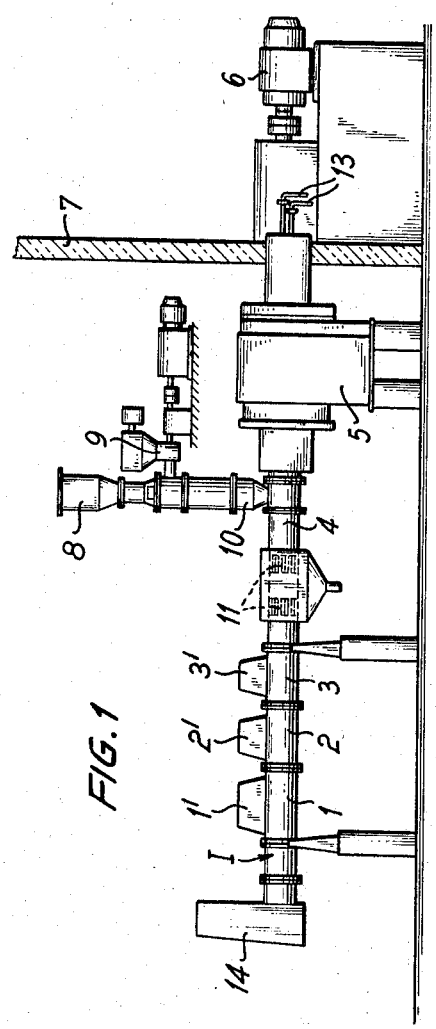
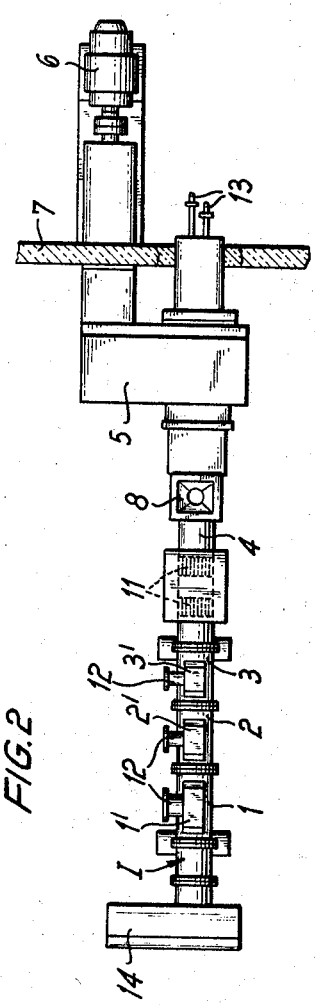

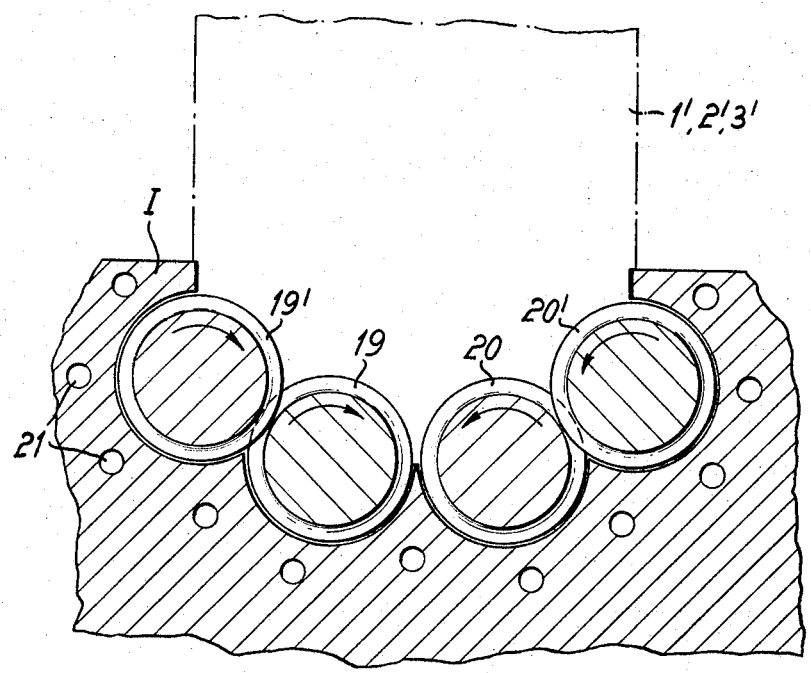

United States Patent Office 3,423,841
Patented Jan. 28, 1969

3,423,841
PROCESS AND DEVICE FOR PRODUCING SOLID EXPLOSIVES AND PROPELLANTS FROM HUMID INITIAL MIXTURES
Herbert Wilhelm Gustav Ocker, Leonberg, Germany, assignor to Werner & Pfleiderer, Stuttgart-Feuerbach, Baden - Wurttemberg, Germany, a corporation of Germany
Filed Jan. 17, 1967, Ser. No. 609,925
Claims priority, application Germany, Jan. 25, 1966, W 40,794
U.S. Cl. 34—14   10 Claims
Int. Cl. F26b 5/04; F42b 33/00

ABSTRACT OF THE DISCLOSURE

A process and device for producing solid explosives and propellants from humid initial mixtures which are conveyed continuously through several drying chambers until they reach a predetermined degree of space located above each drying chamber corresponds to the desired degree of humidity of the material in the particular drying chamber concerned.

---

Figure 3:
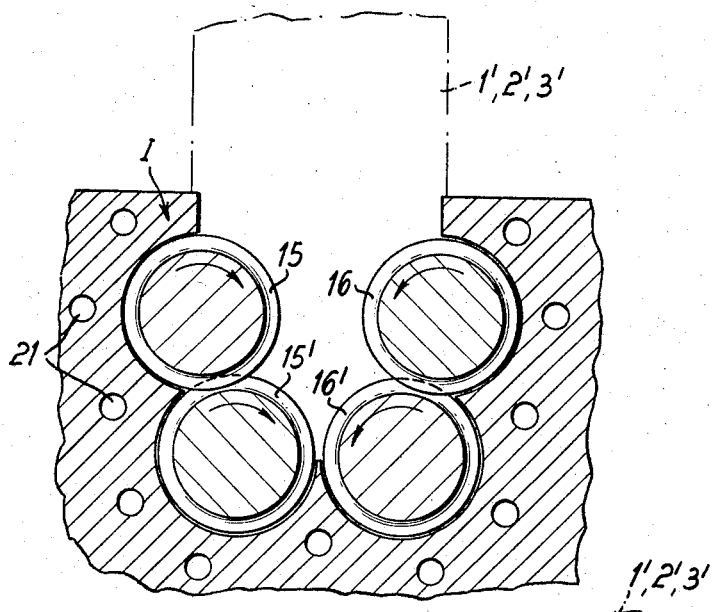

The present invention has as its object a process and device for producing solid explosives and propellants from humid initial mixtures, which are dried in stages to a predetermined degree of humidity.

In known processes for producing solid explosives or propellants, the said mixtures are initially processed in so-called initial squeezing presses of the screw conveyor or analogous type, in order to reduce their humidity content to a predetermined value, and are thereupon formed into a definite shape, for example by means of kneading and rolling mills, tunnel ovens, hydraulic deforming plants or the like, and are thereafter exposed to further drying. This process is relatively onerous and costly however, since the humidity content of the explosives or propellants in their final shape must be maintained at a relatively high value in order to limit the risk of explosions in the course of the final stages of the process in particular to a minimum.

If processing is performed on rolling mills or crushing rolls in particular, it is necessary that these be charged manually, in which connection, the advent of explosions frequently depends on the skill of the operative. To ensure safe processing of the said mixtures in rolling mills or the like, it is necessary moreover that the proportion of dry crumbs or the like be distributed evenly in the mixture to prevent concentration of the same at any point, since this would equally represent a risk of explosion. A particular disadvantage of the known plants operated intermittently, is that the mixture continually come into contact with the atmosphere, so that the said mixtures are affected by generation of static charges, entailing a higher risk of explosion.

According to the present invention, which is intended to eliminate shortcomings of the kind specified above, so that the said mixtures may be dried to a relatively low humidity content in continuous operation and optimum control applied throughout their processing, and this with the minimum risk of explosion, the initial mixture is mandatorily conveyed in continuous manner through several drying spaces positioned immediately behind each other, and is dried in each of the said spaces to a predetermined humidity content, an expansion chamber being co-ordinated with each said drying chamber, the volume of the said expansion chambers being adapted to the degree of humidity of the material present in the corresponding drying chamber. According to the invention, the separate sections of a casing comprising several conveyor screws or worms required for continuous and mandatory conveying of the said mixture, preferably being employed as drying chambers.

In the device organised for application of the process according to the invention, the common casing formed by all the said drying chambers comprises at least three intermeshing conveyor screws or worms. In this connection, it is advisable for the said conveyor screws to be constructed to be self-cleaning in manner known per se, and for the volume of the said screws or worms to increase towards their discharge extremity. This measure primarily ensures that the material to be conveyed, that is to say the mixture for the solid explosive or propellant, is conveyed and processed further in decreasing concentration in step with the decrease in humidity content. The risk of explosions is largely eliminated thereby.

According to the invention, it is advisable moreover that the upper part of the said conveyor screws or worms situated in the said casing be uncovered over at least 60° of their periphery, towards the expansion chambers co-ordinated with the same. This measure is intended to ensure that spontaneous ignition of the said mixtures in one of the processing stages may expend itself by combustion, instead of damaging the plant by a violent explosion.

According to another feature of the invention, it is recommended that four conveyor screws or worms be situated within the said casing, the said screws or worms operating conjointly in self-cleaning manner. This measure ensures especially careful processing of the said mixtures, with minimum friction. The pitch of the said conveyor screws or worms may be chosen according to the mixtures to be processed in each instance. It is advisable moreover for the lines connecting the axial centres of the co-operating pairs of worms or screws to be angled outwards relative to the vertical median plane, thus forming an upwardly widening space even within the said casing, assuring combustion of the said mixture in case of spontaneous ignition, without resulting in a violent explosion.

Since the humidity content diminishes towards the discharge extremity of the said casing, it is advisable for the said expansion chambers to be made with their volumes increasing towards the discharge extremity of the said casing. In an initial processing stage, that is to say into which the said mixture is fed whilst still relatively humid or wet, and in which it may contingently be mixed with additions of dry or other consistency, sections in which liquid ingredients are filtered off, may be intercalated according to the invention. In order to ensure controlled drying of the said mixtures in any event, it is advisable that the said casing and/or the said conveyor screws or worms be heated, and that particular sections thereof also be cooled, contingently. The appropriate heating and cooling sections may then be selected according to the size of the plant in question and/or according to the nature of the mixtures which are to be processed.

Monitoring or detection systems are incorporated in the separate processing spaces moreover, which are intended to detect and regulate the appropriate processing temperature, and thus the degree of humidity in question. According to another feature of the invention, the said expansion chambers are equipped with quenching sprays, and the said sprays may be arranged to operate automatically if a preset limiting temperature is exceeded, to eliminate the risk of premature ignition or explosion. The nature and arrangement of the said detection and control systems are not of critical import, and may be chosen at will within the scope of the invention.

So that the dried mixtures may be given their final form, it is advisable for a forming plant to be arranged in series and immediately after the said casing. The said forming plant may be a granulating head or another device imparting a definite shape to the said mixture. In this case, the control systems are also applied to the said forming plant, thus providing a safety precaution against ignition of the said mixtures in the final processing stage in particular.

A device for application of the process according to the invention will be described in detail in the following, with reference to the accompanying drawings which show embodiments of the device, but in no restrictive sense.

FIGURE 1 illustrates a side view of a device for continuous processing of mixtures for solid explosives and propellants, FIGURE 2 being a simplified illustration in plan view of a device according to FIGURE 1, FIGURES 3 to 5 showing different arrangements of the said conveyor worms or screws within the devices according to FIGURES 1 and 2.

Four conveyor screws driven by means of a motor 6 and a transmission system, may be arranged in the casing I comprising the sections 1, 2, 3 and 4, for example. The said motor 6 is separated from the transmission gear and from the casing 1–4 in particular, by a safety partition 7, to isolate any sparks which may be formed.

The mixture which is to be dried is placed in a hopper or the like 8, and may be mixed in homogeneous manner with ingredients of dry or other consistency fed in through an infeed connector 9, and is passed into the part 4 of the casing through an infeed duct 10. The conveyor screws or worms situated within the casing I, but not illustrated in detail in FIGURES 1 and 2, carry the damp mixture continuously towards the discharge extremity of the casing, first to the part 3 of the casing. Before reaching the section 3 of the casing I, this mixture passes through two filter or screening stages 11 situated within the section 4 of the casing I, in which liquid ingredients present in very damp or wet mixtures may be drawn off or squeezed out. The mixture may contingently also be compressed at this stage, since particularly damp or wet mixtures are not affected by the danger of ignition or explosion.

At its upper side, the section 3 of the casing I however has an expansion space 3' and a vacuum may contingently be applied to the same, to draw off any vapors formed, more rapidly. Like the other sections of the casing and/or the conveyor screws situated in the casing formed by the said sections, the section 3 of the casing may equally be heated or cooled. The pipes or ducts employed for heating the separate sections of the casing have not been shown in detail. The heating or cooling systems may be arranged in many ways and for example in such manner that each of the separate sections 1, 2, 3 and 4 of the casing may be heated as a function of the corresponding degree of humidity, the temperature being monitored continuously by means of special control elements in order to prevent ignition of the mixture in any event. Infeed pipes 13 for an appropriate fluid may be arranged at the driving side of the screws, if the latter are equally to be subject to temperature control.

The processing period of the mixture within a section of the casing depends on the nature of the mixture in question, and may be controlled by means of the speed of rotation of the conveying screws, as well as of their pitch. The mixture thus passes continuously from section 3 of the casing I into section 2, undergoing further drying in the latter. The section 2 of the casing equally has an expansion space 2' whose volume exceeds that of the preceding expansion space 3'. The expansion space 1' of the final processing stage of the mixture, that is to say in the final section 1 of the casing I followed by the discharge extremity, is the largest in view of the decreased humidity content of the mixture entailing a greater risk of ignition of the mixture. The expansion space 3', as well as the expansion spaces 1' and 2' may comprise connectors 12 for application of a vacuum.

After the conveyor screws have passed the mixture through the section 1 of the casing, it may be formed into an appropriate shape by means of an immediately adjacent forming device such as a granulating mechanism 14, for example. The humidity then still present in the shaped mixture, amounting to a very small proportion in particular mixtures, may then be eliminated without danger.

In addition to the vacuum connectors 12, the expansion spaces 1', 2' and 3' may also incorporate safety sprays which are not illustrated in the drawings, and which may be made to operate automatically by the temperature prevailing in the corresponding processing section. This measure is intended to prevent the mixture from exceeding a definite critical temperature limit, thus eliminating the risk of ignition or explosion.

Figure 4:
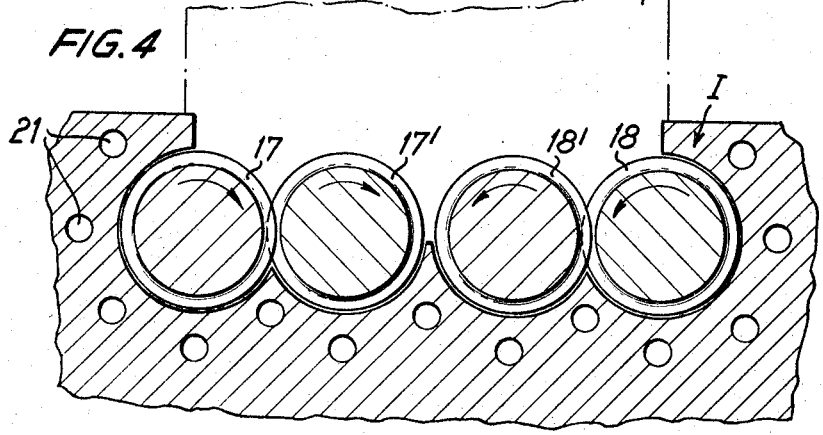

FIGURES 3 to 5 illustrate possibilities for arranging the said screws or worms within the casing I, or within its individual sections. FIGURE 3 shows a cross-section taken through the casing I, the four conveyor crews 15, 15' and 16, 16' being shown diagrammatically. The screws 15, 15' and 16, 16' co-operate in pairs and their direction of rotation is directed towards the middle of the casing I in each case. This measure is intended to prevent accumulations of the mixture at any point of the casing, which could form a critical aggregation containing proportions of different humidity content and could thus represent a risk of explosion.

FIGURE 4 shows another arrangement of the conveyor screws. Two pairs of co-operating screws 17, 17' and 18, 18' are again situated within a casting I. The direction of rotation of the individual screws 17, 17', 18 and 18' is again directed towards the middle of the casing I, but the angle of the connection between the axial centres of the co-operating pairs of screws 17, 17' and 18, 18' is so increased, in comparison with the arrangement of FIGURE 3, that the pairs of screws lie in a shared plane. This arrangement is advisable for mixtures for explosives or propellants of highly explosive nature. As apparent from FIGURE 4, the expansion space 1', 2' or 3' shown dash-dotted above the casing I, is enlarged accordingly.

FIGURE 5 shows an arrangement in which the co-operating pairs of crews 19, 19' and 20, 20' equally form an upwardly widening space within the casing I, followed by the correspondingly dimensioned expansion space 1', 2', 3'. The direction of rotation of the individual conveyor screws is again directed towards the middle of the casing and the size of the expansion space shown dash-dotted above the casing is correspondingly enlarged in comparison with the arrangement of FIGURE 3.

The upwardly uncovered peripheral areas of the screws may thus already be established by selection of the angle of the co-operating pairs of screws or worms relative to the vertical median plane of the casing I. The size of the expansion space, the unconfined screw surface and thus the size of the effective processing space of the mixture may thereby simultaneously be determined and influenced in optimum degree. It is apparent furthermore from FIGURES 3 to 5 that passages 21 may be incorporated within the casing I, for traversal by an appropriately conditioned fluid, and the number, size and spacing of the passages or bores 21 may evidently be chosen according to prevailing conditions.

In order to prevent formation of sparks, it is advisable for the casing I or the conveyor screws to be made of bronze, brass, or the like.

I claim:

1. A method of producing solid explosives and propellants from moisture bearing mixtures comprising turbulently and compressively advancing the moisture bearing mixture sequentially through intercommunicating dehumidifying enclosures to progressively dehumidify the mixture in the successive enclosures and providing the successive enclosures each with an expansion space of a volume to suit the humidity in the respective enclosure and thereby minimize the risk of ignition and explosion of the mixture due to its progressively decreasing humidity.

2. The method of claim 1 wherein moisture is squeezed from the moisture bearing material before it is introduced into the first of the dehumidifying enclosures.

3. The method of claim 1 including the step of applying suction to the expansion spaces.

4. Apparatus for producing solid explosives and propellants for moisture bearing mixtures comprising a casing, means dividing the casing longitudinally into intercommunicating dehumidifying enclosures, means for delivering material to a feed end of the casing, screw conveyor means in the casing for continuously advancing material from the feed end successively through said enclosures, means for discharging material from the last enclosure, each enclosure having a wall spaced from the screw conveyor means to define an expansion space between said wall and the conveyor means, and means for controlling the humidity of each enclosure.

5. The apparatus of claim 4 wherein the expansion spaces increase progressively in volume towards the discharging means.

6. The apparatus of claim 4 including means for expressing liquid from the material before it is fed into the first enclosure.

7. The apparatus of claim 4 wherein the humidity controlling means comprises heat medium flow passage means in the casing.

8. The apparatus of claim 4 wherein the screw conveyor means includes a pair of meshing screw conveyors.

9. The apparatus of claim 4 wherein the screw conveyor means includes two pairs of meshing screw conveyors.

10. The apparatus of claim 4 including means for applying suction to each expansion space.

References Cited

UNITED STATES PATENTS

| 2,373,877 | 4/1945 | Detwiler | 34—83 XR |
| 2,863,353 | 12/1958 | Brimley | 86—1 XR |
| 3,023,456 | 3/1962 | Palfey. | |
| 3,082,816 | 3/1963 | Skidmore. | |
| 3,118,744 | 1/1964 | Erdmenger et al. | 18—12 XR |
| 3,262,215 | 7/1966 | Davis et al. | 34—14 XR |

KENNETH W. SPRAGUE, *Primary Examiner.*

U.S. Cl. X.R.

34—22, 183